United States Patent
Holicki et al.

(10) Patent No.: US 9,453,708 B2
(45) Date of Patent: Sep. 27, 2016

(54) METHOD FOR DETERMINING POSITION DATA OF A TARGET OBJECT IN A REFERENCE SYSTEM

(75) Inventors: Michael Holicki, Munich (DE); Nikolaus Schweyer, Munich (DE); Johannes Speth, Munich (DE); Juergen Zoz, Friedberg (DE)

(73) Assignee: LKF-Lenkflugkoerpersysteme GmbH, Schrobenhausen (DE)

( * ) Notice: Subject to any disclaimer, the term of this patent is extended or adjusted under 35 U.S.C. 154(b) by 1100 days.

(21) Appl. No.: 13/091,664

(22) Filed: Apr. 21, 2011

(65) Prior Publication Data

US 2011/0262008 A1   Oct. 27, 2011

(30) Foreign Application Priority Data

Apr. 24, 2010 (DE) .......................... 10 2010 018 143

(51) Int. Cl.
| | |
|---|---|
| G06K 9/00 | (2006.01) |
| F41G 7/22 | (2006.01) |
| G01S 3/786 | (2006.01) |
| G06K 9/32 | (2006.01) |

(52) U.S. Cl.
CPC ............ *F41G 7/2226* (2013.01); *F41G 7/2246* (2013.01); *F41G 7/2253* (2013.01); *F41G 7/2293* (2013.01); *G01S 3/7865* (2013.01); *G06K 9/3241* (2013.01)

(58) Field of Classification Search
USPC ........................................ 382/103, 106, 154
See application file for complete search history.

(56) References Cited

U.S. PATENT DOCUMENTS

| | | | |
|---|---|---|---|
| 5,881,969 A | 3/1999 | Miller | |
| 8,306,273 B1 * | 11/2012 | Gravseth et al. | ............ 382/106 |
| 2006/0120590 A1 * | 6/2006 | Han et al. | ............ 382/154 |

FOREIGN PATENT DOCUMENTS

| | | |
|---|---|---|
| CH | 675638 A5 | 10/1990 |
| EP | 1 983 292 A1 | 10/2008 |

OTHER PUBLICATIONS

Chen et al.—"Building Reconstruction from LIDAR Data and Aerial Imagery" IEEE, 2005, 2846-2849.*
Christy S., et al., "Terminal air-to-ground missile guidance by infrared seeker", Proceedings of SPIE, Nr. 3086, Apr. 23, 1997, Seiten 223-243, XP002076459, ISSN: 0277-786X.
European Search Report dated Aug. 31, 2011 in related European Patent Application No. 11 00 2853.

* cited by examiner

*Primary Examiner* — Weiwen Yang
(74) *Attorney, Agent, or Firm* — Crowell & Moring LLP

(57) ABSTRACT

A method for determining the position data of a target object in a reference system from an observation position at a distance. A three-dimensional reference model of the surroundings of the target object is provided, the reference model including known geographical location data. An image of the target object and its surroundings, resulting from the observation position for an observer, is matched with the reference model. The position data of the sighted target object in the reference model is determined as relative position data with respect to known location data of the reference model.

10 Claims, 1 Drawing Sheet

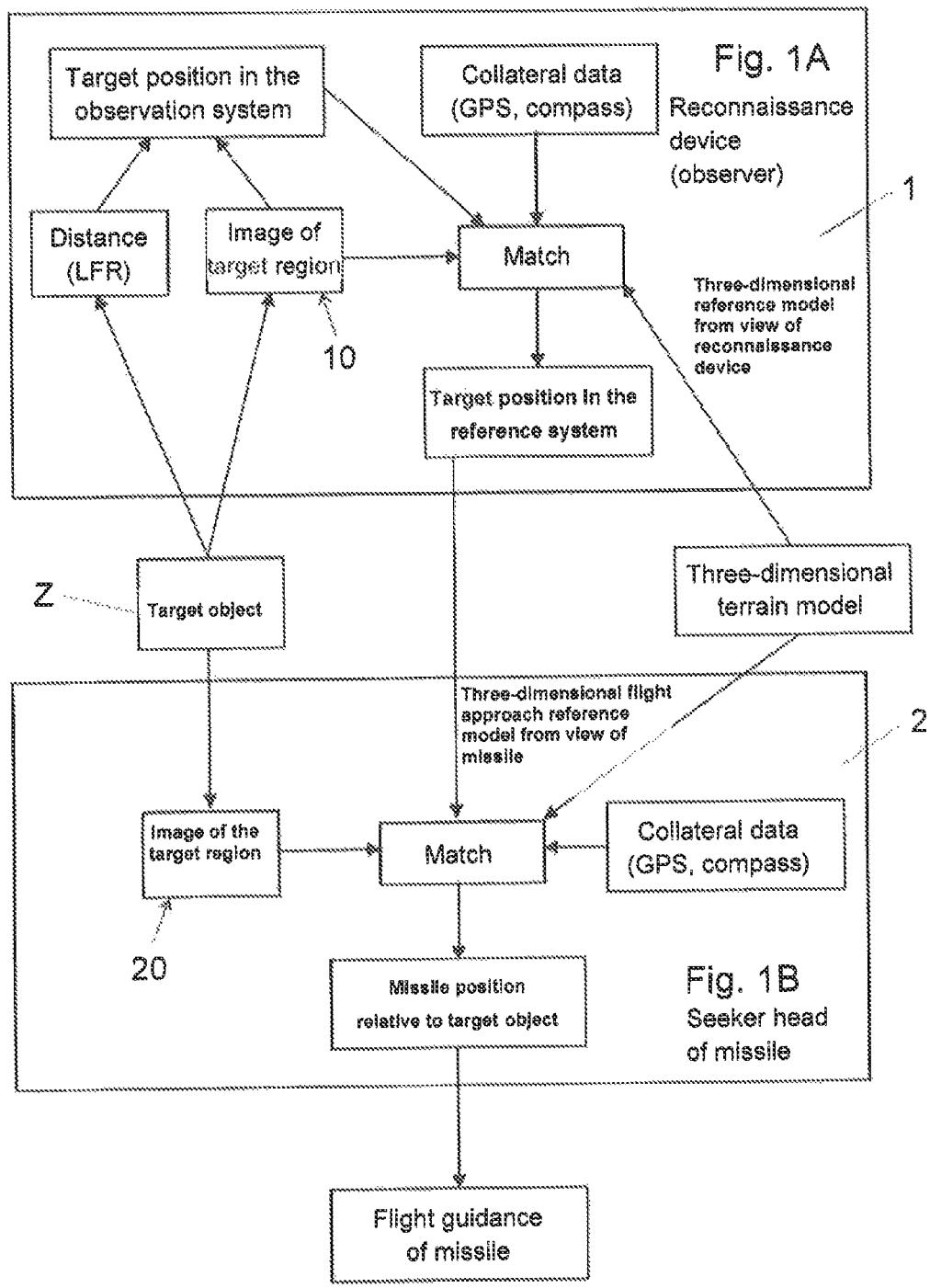

METHOD FOR DETERMINING POSITION DATA OF A TARGET OBJECT IN A REFERENCE SYSTEM

CROSS REFERENCE TO RELATED APPLICATIONS

This application claims priority under 35 U.S.C. §119 to German Patent Application No. 10 2010 018 143.9, filed Apr. 24, 2010, the entire disclosure of which is herein expressly incorporated by reference.

BACKGROUND AND SUMMARY OF THE INVENTION

Exemplary embodiments of the present invention relate to a method for determining position data of a target object in a reference system from an observation position at a distance therefrom. Exemplary embodiments of the present invention further relate to a method for guiding an airborne weapon system to a target object and for aiming a weapon at the target object.

Many different operational forces may be present at various locations in the vicinity of a target area. The integration of information obtained from these distributed operational forces concerning the target area is necessary for situation assessment, and forms the basis for a coordinated response by these operational forces. Precise and unambiguous target data play a significant role in this regard.

Frequently, ground forces have already advanced near a target, and request air support. Coordination of an operation involving such forces spread out over a local area requires precise information concerning the target location. The most accurate position data of the target object which are necessary for this purpose may be obtained by operational forces which are already in the vicinity of the target. However, the position data of the target object obtained in this manner are initially only relative position data between the position of the target and the position of the observer.

One known option for guiding a deployed weapon, for example a missile, to a target is for the observer to illuminate the target, using a suitable device, and for the airborne missile to seek and approach the coded illuminated point. A major disadvantage of this method is that the observer may be revealed by the active illumination, which must necessarily be maintained for a certain period of time. In addition, this method is difficult to carry out in highly built-up areas due to a large number of obstructions and the resulting shadows from buildings.

Another known option for guiding a missile to a target is to use devices for determining geographical position data, for example satellite navigation devices, compasses, and maps, to ascertain the geographical position data of the target object and guide the missile to the target coordinates thus ascertained. However, such a determination of the geographical position data does not always meet the accuracy requirements necessary for a precise attack. In particular when civilian buildings and facilities are in the vicinity of the target object, the accuracy of the geographical position data determined in this manner is not sufficient to avoid inflicting collateral damage. Especially in urban areas or other densely populated regions, the slightest errors in determining the position data of the target object may have devastating consequences. The unambiguous and precise determination of the position data of the target object, for example a building from which the enemy is firing on forces, which is required for this operation scenario demands extremely high precision, which is not achievable from a safe distance using the means currently known.

Exemplary embodiments of the present invention provide a method for determining the position data of a target object from an observation position at a distance therefrom, which allows the position data of the target object to be precisely determined and the target to be unambiguously defined so that the target may also be quickly and clearly identified from a location other than the observation position, for example from an airborne missile.

Exemplary embodiments of the present invention involve:
a) Providing a three-dimensional reference model of the surroundings of the target object, the model including geographical location data;
b) Matching an image of the target object and its surroundings, resulting from the observation position for an observer, with the reference model; and
c) Determining the position data of the sighted target object in the reference model as relative position data with respect to known location data of the reference model.

Thus, according to an exemplary method of the invention, a shared three-dimensional reference model of the surroundings of the target object is provided to the observer. This three-dimensional reference model is also available to the airborne weapon. Using the above-mentioned steps of the method according to the invention, the observer is able to identify the target object in the three-dimensional reference model and define its position in this reference model. Based on the relative position data of the target object in the three-dimensional reference model defined in this way, the target object may be unambiguously identified from any other direction, and the weapon that is approaching from a given direction is able to unambiguously find and precisely strike the target object. The absolute positional accuracy of the three-dimensional reference model plays only a minor role, and only needs to be great enough that the association between the three-dimensional reference model and the scene that is modeled by an imaging device of the observer or the airborne weapon is possible. The use of relative position data of the target object in a reference system containing the reference model allows a reliable target definition and target address solely on the basis of the particular recorded image and the reference model, without having to precisely determine the absolute geographical position data of the target object, of the observer, and, for engagement of a target, also of the weapon.

One advantageous refinement of the method according to the invention involves the reference model provided in step a) being obtained from aerial photographs and/or satellite photographs of the target object and its surroundings. The reference models may be created in various ways. One option is photogrammetric measurement of high-resolution aerial photographs; another option is to carry out a three-dimensional reconstruction of the reference model based on image sequences recorded by reconnaissance aircraft, for example.

Alternatively or additionally, radar or LIDAR measurements of the target object and/or its surroundings may be used to obtain the reference model provided in step a).

In one advantageous embodiment of the method according to the invention, the image of the target object and its surroundings is matched to the reference model in step b) in the following substeps:
b1) Creating a three-dimensional line model from the three-dimensional reference model;

b2) Projecting the line model into the image of the target object and its surroundings recorded by an imaging device, based on a rough position and location hypothesis;

b3) Matching the lines of the three-dimensional line model with line segments extracted from the image line; and b4) Computing a correction of the position and location hypothesis based on the match;

whereby the correction determined in step b4) is taken into account in determining the position data of the target object in step c). The image of the target object and its surroundings recorded from the observation position using a camera, for example, is matched to the three-dimensional reference model of the recorded scene. Based on this match, correction factors are computed for the position and location hypothesis, allowing the position and the location of the camera, i.e., of the observation position, to be accurately determined.

According to this advantageous refinement of the method according to the invention, first a three-dimensional line model is created in order to obtain a linear three-dimensional reference model. For the observer and the seeker head of an airborne missile, these lines form the basis for the positioning and location of the observer's own observation position. In addition to the three-dimensional reference model and the recorded camera image from the observation position, i.e., the camera image sequence, additional surroundings data may be entered for a rough initial position and location hypothesis. These surroundings data and additional data may be ascertained, for example, using a compass and satellite navigation system, or, in the case of a missile, via an integrated satellite navigation system and/or inertial navigation system.

In the method according to the invention for determining the position data of the target object based on the location data of the reference model in step c), it is also advantageous for the following substeps to be carried out:

c1) Determining the geographical position data of the observation position;

c2) Determining the position data of the target object relative to the position data of the observation position;

c3) Ascertaining the relative position data of the target object in relation to the reference model.

By ascertaining the relative position data of the target object in relation to the reference model according to these steps, an accurate relative position of the target object in the reference model may be easily defined using the position data of the observation position, determined by a satellite navigation device, for example, and the reference model, as well as the correction data determined in step b).

It is advantageous when the position data of the target object relative to the position data of the observation position are determined in step c2) by carrying out a distance measurement, preferably a laser range finding measurement, that is directed to the target object from the observation position, whereby the direction and the distance between the observation position and the target object ascertained in the distance measurement are used for determining the position data of the target object.

Alternatively, the position data of the target object based on the location data of the reference model in step c) may be determined in that the imaging device, which is located at the observation position, defines a virtual sight beam which corresponds, for example, to the optical axis of the imaging device, and the coordinates of the target point in the reference model, which is imaged by this sight beam on the target object, are determined as position data of the target object.

Exemplary embodiments of the present invention further relate to a method for guiding an airborne weapon system to an target object and for aiming a weapon of this weapon system at the target object, the position data of the target object in a reference system first being determined as relative position data in a reference model according to one of the preceding claims, and the following steps then being carried out for guiding the missile:

aa) Recording an image of the target object and its surroundings, using an imaging device provided onboard the missile;

bb) Matching the image obtained in step aa) with the three-dimensional reference model;

cc) Determining the position data of the imaging device, and thus of the missile, relative to the position data of the target object; and dd) Guiding the missile to the target object, using the position of the missile relative to the target object ascertained in step cc).

This flight guidance method likewise makes use of the information concerning the relative position of the target object in the reference model. The airborne missile, using its imaging device, views the target object and its surroundings from a different viewpoint than the observer at the observation position. Also in this flight guidance method, the image obtained from the imaging device is first matched to the three-dimensional reference model. Since the coordinates of the target object in the reference model, i.e., in the reference system, have already been ascertained by the observer, the position of the missile relative to the target object may be quickly and easily determined, and therefore the missile may be reliably and accurately guided to the target object.

The airborne weapon system can be an unmanned missile which is guided to the target object using the method.

Alternatively, the airborne weapon system may be an aircraft provided with at least one weapon, for example a combat helicopter, the weapon being directed at the target object using the method.

Preferred exemplary embodiments of the invention together with additional design details and further advantages are described and explained in greater detail below with reference to the accompanying drawings.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a schematic illustration of the sequence of the individual method steps, and the method for determining the position data of a target object from an observation position at a distance therefrom, as well as the method for guiding an unmanned missile to the target object.

DETAILED DESCRIPTION OF THE DRAWINGS

FIG. 1 schematically shows in part 1A the steps of the method for determining the position data of a target object Z from an observation position at a distance therefrom, using a reconnaissance device 1 of an observer. The method steps of the method for guiding an unmanned missile to the target object Z are schematically shown in part 1B of FIG. 1. The method for determining the position data of the target object from an observation position at a distance therefrom is first described with reference to part 1A of the FIGURE.

An observer located at an observation position that is at a distance from target object Z, but from which the observer has a clear line of sight to the target object Z, is equipped with a reconnaissance device 1 having an imaging device 10, for example an electronic camera. The observer sights the target object Z and its surroundings, using the imaging device 10. The imaging device 10 provides an image that is displayed on a monitor, for example, and in which the position of the target object Z is defined as the target position in the observation system. This image is then matched to a reference model. Data of a three-dimensional terrain model of the surroundings of the target object, obtained from the surroundings of the target object at an earlier point in time, are entered into the image in the form of the reference model that takes the observation direction into account, and the image recorded by the imaging device is superimposed with characteristic lines of a line model created from the reference model. For this purpose, first the geographical position data of the observation position, i.e., the location of the imaging device, as well as the direction and distance of the observation position to target object Z are determined as so-called collateral data. These position data of the observation position are then used in a computing device of the reconnaissance device in order to orient the three-dimensional reference model R in such a way that in its perspective representation on the monitor roughly corresponds to the actual image that has been recorded by the imaging device, i.e., the image of the target region.

The computing device of the reconnaissance device then makes a pattern comparison with the lines of the line model from the reference model, based on characteristic lines that are obtained from the image recorded by the imaging device. As a result of this pattern comparison, deviations in the location and position of each pair of mutually associated lines from the lines of the reference model and from the lines extracted from the recorded image are compensated for by relative displacement of the two line models with respect to one another, ultimately allowing the position data of the sighted target object in the reference model to be determined as relative position data for known location data of the reference model. The location of the target object in the reference model is thus unambiguously defined.

For this purpose the observer uses the reconnaissance device, which besides the imaging device contains additional sensors that provide a rough position and location hypothesis of the geographical position data of the imaging device, and thus, of the reconnaissance device and the observation position. Such additional sensors may be, for example, a satellite navigation device or a compass.

The reconnaissance device may optionally also be equipped with a laser range finder (LRF) for determining the distance from the target object. Thus, based on the image of the target object and its surroundings, the distance measurement, and the position and location hypothesis, the observer is able to develop a hypothesis for the absolute position data of the target object. However, due to the inaccuracies of the sensors that are used, this hypothesis is not precise enough on its own to guide a precision missile. In particular, the measurement errors of a compass or an alternatively used gyro north finder would result in significant errors in the target positioning at large distances from the target. This, in turn, would result in collateral damage in the attack on the target by a missile. Instead, the method according to the invention is used, in which the position of the target object relative to the reference model is determined.

This determination of the position data of the target object relative to the reference model may be carried out in two different ways. In the first case, the previously mentioned laser range finder is used to determine the position of the target relative to the observer, i.e., relative to the observation position. Together with the known geographical position data of the observation position, the distance from the target that is measured by the laser range finder, and the direction of the observation position with respect to the target object, the target point that is defined by the relative position data of the target object in the reference model may be determined.

In the second alternative case, no laser range finder is needed. In this case the image of the target object recorded by the imaging device defines a three-dimensional sight beam that is defined, for example, by the optical axis of the imaging device, provided that the target object is in the center of the image. At the point where this sight beam intersects a surface or line of the reference model associated with the target object, the target is in the reference model. This second variant has the advantage that it does not require a laser range finder and is therefore completely passive. Thus, the observer does not have to reveal his presence via a laser beam. However, this variant is dependent on the target object being contained in the reference model at least as a surface or line. Thus, only targets that are a component of the structure modeled in the reference model may be defined, such as a window or door of a house modeled in the reference model. Target objects that are not a component of the reference model, such as a vehicle parked in front of a house, cannot be unambiguously positioned in the reference model using this variant. For such target objects, a distance measurement using a laser range finder, for example, and the procedure according to the first variant are necessary.

In principle, of course, it is also conceivable that both of the above-mentioned variants are available to the observer in the reconnaissance device and may be selectively used. Each of the two variants provides a target point in the three-dimensional reference model that is defined in its three spatial coordinates relative to the coordinate system of the reference model. The observer may either transfer these relative target point coordinates to a control center for general situation assessment, or transmit them directly to a missile for guiding same.

The manner in which these relative target point data are used for guiding the missile provided with a seeker head 2 to the target object is described below, with reference to part 1B of the FIGURE.

After the target point has been specified and defined by the observer in the above-described manner as a coordinate point of the target object in the three-dimensional reference model of the observer, and thus in the three-dimensional terrain model of the surroundings of the target object, the mission to be flown by the missile is planned. The planned direction of approach of the missile to the target object is specified based on the target position and the existing three-dimensional terrain model of the target surroundings in a manner appropriate for the mission operation. A flight approach reference model is computed and generated from the three-dimensional terrain model as a function of the target point and the specified approach direction.

In the flight phase of the approach of the missile to the target object and the target surroundings, for orientation the seeker head 2 provided in the missile initially relies on the collateral data from a satellite navigation system and an inertial navigation system present in the missile in order to roughly determine the position of the missile relative to the target. This information concerning the approximate position of the missile is then used to project the three-dimensional flight approach reference model into an image instantaneously recorded by an imaging device 20 in the seeker head 2 of the missile. As a result of the subsequent matching of this image to the projection of the three-dimensional flight approach reference model, the exact position and location of the missile relative to the target point are computed analogously as described above with regard to part 1A of the FIGURE. Also for the missile, the inaccuracies in the measurement of its position using the satellite navigation system and the inertial navigation system are thus compensated for, resulting in a more precise engagement with the target object.

Although the preceding description describes that the corresponding three-dimensional reference model is projected into an image instantaneously recorded by an imaging device (of the reconnaissance device or the missile) and optionally displayed on a monitor, it is not absolutely necessary to carry out this projection and to display same on a monitor. It is sufficient to combine the corresponding data of the reference model and of the image in a computing device, and to carry out the appropriate matching between the deviating relative locations of the recorded image and the scene of the reference model solely in a computing device of the reconnaissance device or the missile.

Although in the preceding description a missile and a seeker head are consistently referred to for easier understanding, a different weapon carrier, for example a helicopter or an aircraft, having a suitable device for the image recording and for matching the reference model to the recorded image may be used.

Reference numerals in the claims, description, and drawings are used solely for better understanding of the invention, and are not to be construed as limiting to the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Reconnaissance device
2 Seeker head
10 Imaging device for 1
20 Imaging device for 2
Z Target object

What is claimed is:
1. A method comprising the steps of:
   a) receiving, by a reconnaissance device, a three-dimensional reference model of surroundings of a target object, the three-dimensional reference model including known geographical location data;
   b) matching, by the reconnaissance device, an image of the target object and its surroundings, captured by the reconnaissance device from an observation position for an observer, with the reference model;
   c) determining, by the reconnaissance device, position data of the target object in the reference model as relative position data with respect to the known geographic location data of the reference model; and
   d) transmitting, by the reconnaissance device, the relative position data to an airborne weapon system, wherein the reconnaissance device is independent of the airborne weapon system.

2. The method according to claim 1, wherein the three-dimensional reference model received in step a) is obtained from aerial photographs or satellite photographs of the target object and its surroundings.

3. The method according to claim 1, wherein the reference model received in step a) is obtained from radar or LIDAR measurements of the target object or its surroundings.

4. The method according to claim 1, wherein the image of the target object and its surroundings is matched to the reference model in step b) in the following substeps:
   b1) creating a three-dimensional line model from the three-dimensional reference model;
   b2) projecting the three-dimensional line model into the image of the target object and its surroundings recorded by an imaging device, based on a rough position and location hypothesis;
   b3) matching lines of the three-dimensional line model with line segments extracted from an image line of the image with the projected line model; and
   b4) computing a correction of the rough position and location hypothesis based on the match;
   wherein the correction determined in step b4) is accounted for in determining the position data of the target object in step c).

5. The method according to claim 1, wherein to determine position data of the target object based on the known geographic location data of the reference model in step c), the following substeps are carried out:
   c1) determining geographical position data of the observation position;
   c2) determining the position data of the target object relative to the position data of the observation position;
   c3) ascertaining the relative position data of the target object in relation to the reference model.

6. The method according to claim 5, wherein the position data of the target object relative to the position data of the observation position are determined in step c2) using a laser range finding measurement that is directed to the target object from the observation position, wherein direction and distance ascertained in the distance measurement are used for determining the position data of the target object.

7. The method according to claim 1, wherein the determination of the position data of the target object based on the known geographic location data of the reference model in step c) by an imaging device located at the observation position involves defining a virtual sight beam corresponding to an optical axis of the imaging device, and determining coordinates of a target point in the reference model, which is imaged by the virtual sight beam on the target object, as position data of the target object.

8. A method comprising the steps of:
   receiving, by an airborne weapon system from an independent reconnaissance device, position data of a target object in a three-dimensional reference model as relative position data with respect to known geographic location data of the reference model;
   aa) recording an image of the target object and its surroundings, using an imaging device provided onboard the airborne weapon system;
   bb) matching, by the airborne weapon system, the image obtained in step aa) with the three-dimensional reference model;

cc) determining, by the airborne weapon system, position data of the imaging device provided on board the airborne weapon system relative to the position data of the target object; and
dd) guiding a missile to the target object using a position of the missile relative to the target object ascertained in step cc).

9. The method according to claim 8, wherein the airborne weapon system is the missile that is guided to the target object and the missile is an unmanned missile.

10. The method according to claim 8, wherein the airborne weapon system is an aircraft provided with the missile that is guided to the target object.

\* \* \* \* \*